US012109933B2

(12) United States Patent
Kim

(10) Patent No.: US 12,109,933 B2
(45) Date of Patent: Oct. 8, 2024

(54) IMAGE OUTPUT DEVICE AND IMAGE OUTPUT METHOD USING THE SAME

(71) Applicant: HYUNDAI MOBIS CO., LTD., Seoul (KR)

(72) Inventor: Myeong Je Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 77 days.

(21) Appl. No.: 18/145,575

(22) Filed: Dec. 22, 2022

(65) Prior Publication Data

US 2023/0219485 A1 Jul. 13, 2023

(30) Foreign Application Priority Data

Jan. 13, 2022 (KR) ........................ 10-2022-0005017

(51) Int. Cl.
*B60Q 1/04* (2006.01)
(52) U.S. Cl.
CPC ............ *B60Q 1/04* (2013.01); *B60Q 2400/20* (2013.01); *B60Q 2400/50* (2013.01)
(58) Field of Classification Search
CPC ... B60Q 1/04; B60Q 2400/20; B60Q 2400/50
See application file for complete search history.

(56) References Cited

U.S. PATENT DOCUMENTS

| | | | | |
|---|---|---|---|---|
| 6,570,623 B1* | 5/2003 | Li | .................. | H04N 9/3194 |
| | | | | 348/E5.142 |
| 6,993,255 B2* | 1/2006 | Braun | .................. | G01C 11/025 |
| | | | | 396/164 |
| 7,193,654 B2* | 3/2007 | Baker | .................. | H04N 9/3147 |
| | | | | 345/1.3 |
| 10,134,280 B1* | 11/2018 | You | .................. | B60Q 1/525 |
| 10,336,242 B2* | 7/2019 | Canonne | .................. | B60Q 1/0076 |
| 10,421,389 B2* | 9/2019 | Nagata | .................. | G01S 13/931 |
| 10,442,342 B2* | 10/2019 | Mouri | .................. | F21S 41/675 |
| 10,717,384 B2* | 7/2020 | Yu | .................. | G05D 1/0088 |
| 10,944,944 B2* | 3/2021 | Beier | .................. | H04N 9/3147 |
| 11,338,729 B2* | 5/2022 | Verbeke | .................. | B60Q 1/547 |
| 2004/0252516 A1* | 12/2004 | Brun | .................. | B60Q 1/0011 |
| | | | | 362/465 |
| 2008/0198372 A1* | 8/2008 | Pan | .................. | F21S 41/645 |
| | | | | 356/121 |
| 2012/0075878 A1* | 3/2012 | Sato | .................. | G03B 35/20 |
| | | | | 362/543 |
| 2015/0237317 A1* | 8/2015 | Ehara | .................. | H04N 23/698 |
| | | | | 348/745 |
| 2017/0158112 A1* | 6/2017 | Mouri | .................. | F21S 41/675 |
| 2017/0240096 A1* | 8/2017 | Ross | .................. | G05D 1/0212 |
| 2019/0049090 A1* | 2/2019 | Krishnan | .................. | B60Q 1/507 |
| 2022/0048426 A1* | 2/2022 | Huester | .................. | B60Q 1/06 |
| 2022/0307671 A1* | 9/2022 | Bremer | .................. | B60Q 1/085 |
| 2023/0219485 A1* | 7/2023 | Kim | .................. | G09G 5/006 |
| | | | | 340/468 |
| 2024/0116427 A1* | 4/2024 | Kato | .................. | B60Q 1/04 |

* cited by examiner

*Primary Examiner* — Nay Tun
(74) *Attorney, Agent, or Firm* — NovoTechIP International PLLC

(57) ABSTRACT

An image output device for external lamps of a vehicle may include an interface that outputs video data, an image processing device that generates a first video image and a second video image based on the video data, and an output device including the external lamps that outputs the first video image and the second video image.

11 Claims, 7 Drawing Sheets

IMAGE OUTPUT DEVICE AND IMAGE OUTPUT METHOD USING THE SAME

CROSS-REFERENCE TO RELATED APPLICATION

This application claims the benefit of priority to Korean Patent Application No. 10-2022-0005017, filed in the Korean Intellectual Property Office on Jan. 13, 2022, the entire contents of which are incorporated herein by reference.

TECHNICAL FIELD

Embodiments disclosed herein relate to an image output device and an image output method using the same, and vehicle headlamps incorporating the same.

BACKGROUND

In general, a headlamp of a vehicle is used to secure a stable front view at night or in situations such as a dark tunnel, fog, or rain.

Recently, as the use of high-resolution LEDs has been expanded, high-resolution LEDs are also used in headlamps of vehicles. Accordingly, technologies and applications for projecting images onto a road surface or a specific object using vehicle headlamps are being developed.

A headlamp for a vehicle uses a video interface that generates image data to project an image. In this case, the headlamp is composed of a pair of a left headlamp and a right headlamp, so that two video interfaces are generally required for the headlamps to output images.

When using two video interfaces, it is common to use a high-end image processor or two low-end image processors. However, when the image processor is configured and used as described above, there is a problem in that material costs increase.

SUMMARY

The present disclosure has been made to solve the above-mentioned problems occurring in the prior art while advantages achieved by the prior art are maintained intact.

An aspect of the present disclosure provides an image output device capable of implementing outputs of two left and right lamps with only one image interface and an image output method using the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an image output device may include an interface that outputs video data, an image processing device that generates a first video image and a second video image based on the video data, and an output device that outputs the first video image and the second video image.

The video data may include color data, and the image processing device may generate the first video image and the second video image based on the color data.

The color data may include first color data, second color data, and third color data, and the image processing device may generate the first video image based on one color data of the first color data, the second color data, and the third color data and generate the second video image based on color data different from one color data corresponding to the first video image among the first color data, the second color data, and the third color data.

The output device may include a first output device and a second output device, the first output device may output the first video image, and the second output device may output the second video image.

The image processing device may include a serializer.

The video data may have a horizontal resolution equal to a sum of horizontal resolutions of the first video image and the second video image.

The image processing device may generate the first video image and the second video image having the same resolution.

The video data may have a frequency ½ times a frequency of the first video image and the second video image.

The output device may include a first output device and a second output device, such as external lamps of a vehicle, e.g., headlamps, and the first output device may output the first video image, and the second output device may output the second video image.

According to an aspect of the present disclosure, an image output method may include outputting video data, generating a first video image and a second video image based on the video data, and outputting the first video image and the second video image such as from external lamps of a vehicle, e.g., headlamps.

The video data may include first color data, second color data, and third color data, the generating of the first video image and the second video image based on the video data may include generating the first video image based on one color data among the first color data, the second color data, and the third color and generating the second video image based on color data different from one color data corresponding to the first video image among the first color data, the second color data, and the third color data.

The generating of the first video image and the second video image based on the video data may include generating the first video image and the second video image having the same resolution.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
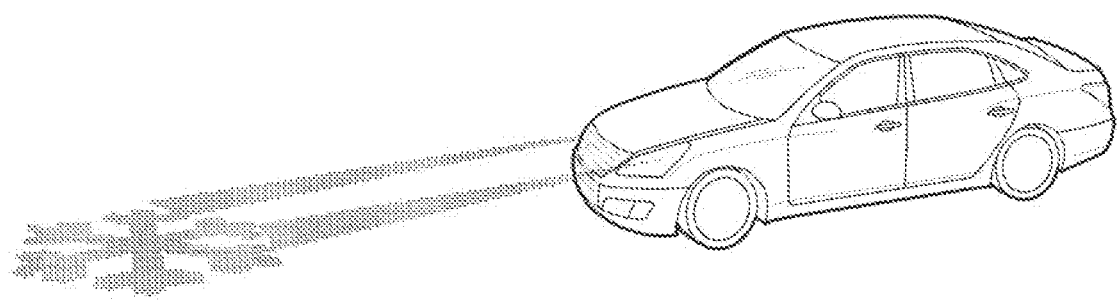
FIG. 1 is a diagram illustrating an example of an image output from a headlamp.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

In this specification, the singular form of a noun corresponding to an item may include one item or a plurality of items, unless the context clearly dictates otherwise. In this specification, each of phrases such as "A or B", "at least one of A and B", "at least one of A or B", "A, B or C", "at least one of A, B and C" and "at least one of A, B or C" may include any one of the items listed together in the corresponding one of the phrases, or all possible combinations thereof. Terms such as "first", "second" may simply be used to distinguish a given component from other corresponding components, and do not limit a given component in another aspect (e.g., importance or order). When a certain (e.g., first) component is mentioned as being "coupled" or "connected" to another (e.g., second) component, with or without the terms "functionally" or "communicatively", it means that the certain component is able to be connected to the other component directly (e.g. by wire), wirelessly, or through a third component.

Each component (e.g., module or program) of the components described herein may include singular or plural objects. According to various embodiments, one or more components or operations among corresponding components may be omitted, or one or more other components or operations may be added. Alternatively or additionally, a plurality of components (e.g., modules or programs) may be integrated into a single component. In this case, the integrated component may perform one or more functions of the plurality of components identically or similarly to those performed by corresponding components of the plurality of components prior to the integration. Operations performed by a module, a program, or other components according to various embodiments may be executed sequentially, in parallel, repeatedly, or in a heuristic method. In addition, one or more of the operations may be executed in different sequences or may be omitted. Alternatively, one or more other operations may be added.

The term "module" or "unit" used in the disclosure may represent, for example, a unit including one or more combinations of hardware, software and firmware. The "module" may be a minimum unit of an integrated part or a part thereof or may be a minimum unit for performing one or more functions or a part thereof. For example, according to one embodiment, a module may be implemented in the form of an application-specific integrated circuit (ASIC).

Various embodiments of this document may be implemented as software (e.g., a program or application) including one or more instructions stored in a storage medium (e.g., memory) readable by a machine. For example, the processor of the device may call at least one command among one or more commands stored from a storage medium and execute it. This enables the device to be operated to perform at least one function according to the at least one command invoked. The one or more instructions may contain a code made by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this team does not differentiate between where data is semi-permanently stored in the storage medium and where the data is temporarily stored in the storage medium.

Figure 2:
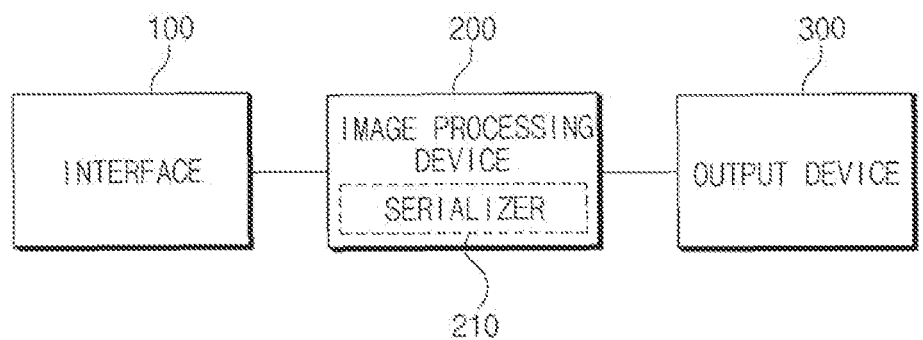
FIG. 2 is a diagram illustrating an image output device according to an embodiment disclosed herein.

FIG. 2 is a diagram illustrating an image output device according to an embodiment disclosed herein.

Referring to FIG. 2, an image output device may include an interface 100, an image processing device 200, and an output device 300.

According to an embodiment, the interface 100 may output image data. The video data may refer to data for generating a video image. For example, the video data may include image data and/or color data corresponding to each of pixels of a video image to be output. The interface 100 may include an image processor that generates video data.

According to an embodiment, the interface 100 may be an RGB interface. The RGB interface may output RED data, GREEN data, and BLUE data. The RED data, the GREEN data, and the BLUE data may have the data capacity of the same number of bits (e.g., 8 bits). The RGB interface may output 24-bit data. However, the number of bits is not limited thereto, and a multiple of 3 may be allowable. As the number of bits output by the RGB interface increases, high-resolution image processing may be further facilitated.

According to an embodiment, the image processing device 200 may generate a first video image I1 and a second video image I2 based on the video data. According to an embodiment, the video data may include color data, and the image processing device 200 may generate the first video image I1 and the second video image I2 based on the color data.

According to an embodiment, the image processing device 200 may include a serializer 210. The serializer 210 may convert the video data into serial data. For example, the serial data may include data serially arranged in units of 1 bit. The image processing device 200 may sequentially transmit the serial data to an external device in units of arbitrary bits (units of 1 bit). The image processing device 200 may communicate with the external device in a wired or wireless manner. The image processing device 200 may transmit the serial data based on the video data to the external device. For example, the image processing device 200 may transmit the serial data to a driver.

According to the embodiment, the output device 300 may output the first video image I1 and the second video image I2. According to the embodiment, the output device 300 may include various lamps existing in a vehicle, for example, a head lamp, a rear lamp, a tail lamp, and the like. The output device 300 may be a headlamp, and the headlamp may be a digital micro-mirror device (DMD) or a high-resolution headlamp using an LED MATRIX. For example, the output device 300 may include a plurality of LED light sources, and output the first video image I1 and the second video image I2 to a road surface or a specific object by turning on the LED light sources individually.

According to the embodiment, the output device 300 may include a power module (not shown) that supplies power to the LED light sources constituting the output device 300.

According to an embodiment, the image output device may include a driver (not shown) that controls the output device 300 such that the image processing device 200 outputs the first video image I1 and the second video image I2. For example, the driver may control the on/off states of the LED light sources constituting the output device 300 to output a video image generated by the image processing device 200. The driver may include a Micro Controlling Unit (MCU) and software for controlling the output device 300.

The image output device may generate the first video image I1 and the second video image I2 based on one interface. Therefore, the image output device may not use a plurality of interfaces, and may reduce material costs by adjusting the specifications and number of image processors.

Figure 3:
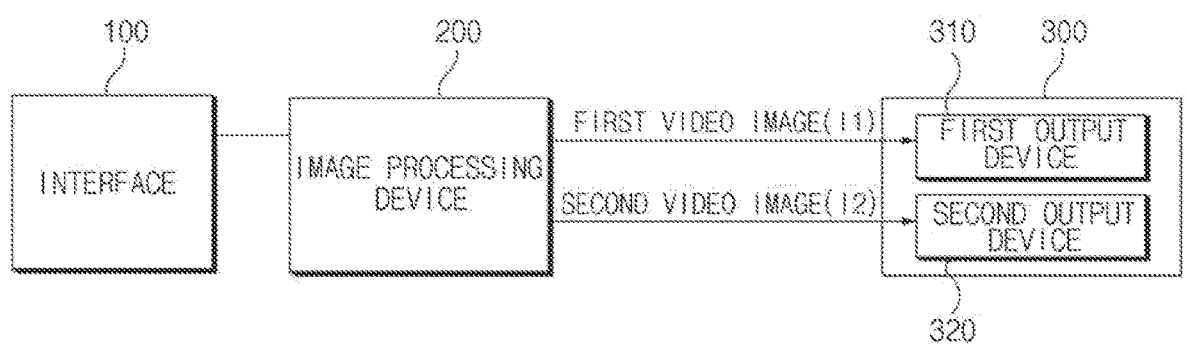
FIG. 3 is a diagram illustrating an image output device including a first output device and a second output device according to an embodiment disclosed herein.

FIG. 3 is a diagram illustrating an image output device including a first output device and a second output device according to an embodiment disclosed herein.

Referring to FIG. 3, the output device 300 may include a first output device 310 and a second output device 320.

According to the embodiment, the output device 300 may include a headlamp of a vehicle, and the headlamp may include two lamps which are symmetrical left and right. For example, the first output device 310 may include a left headlamp, and the second output device 320 may include a right headlamp.

According to the embodiment, the first output device 310 may output the first video image I1, and the second output device 320 may output the second video image I2. The first output device 310 may output the first video image I1 and the second output device 320 may output the second video image I2, making it possible to emit, toward a road surface or wall, the first video image I1 and the second video image I2 or an image obtaining by synthesizing the first video image I1 and the second video image I2.

Figure 4:
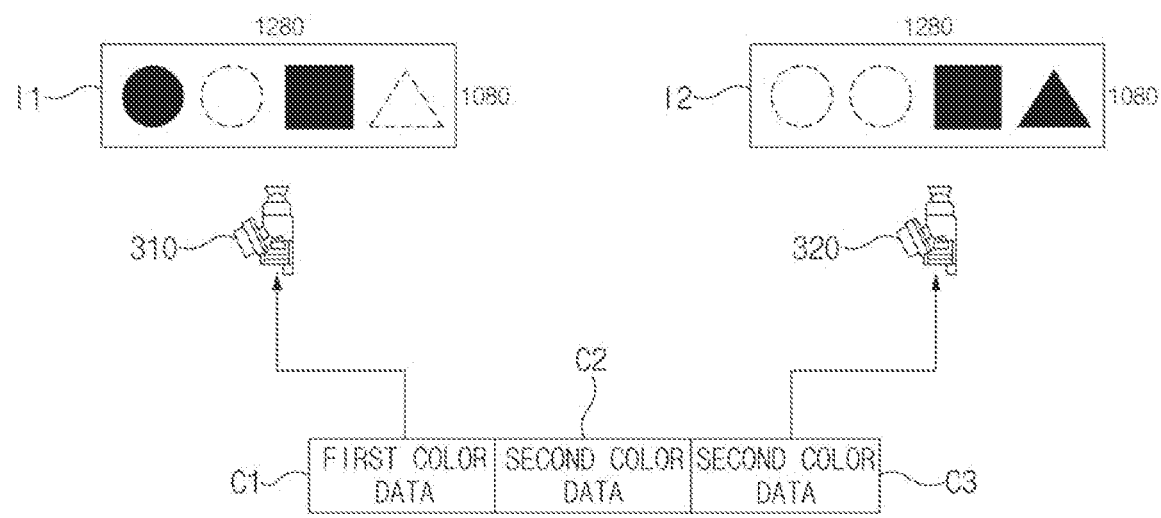
FIG. 4 is a diagram illustrating an example of generating a first video image and a second video image based on video data according to an embodiment disclosed herein.

FIG. 4 is a diagram illustrating an example of generating a first video image and a second video image based on video data according to an embodiment disclosed herein.

Referring to FIG. 4, an example of a process of generating the first video image I1 and a second video image based on video data is shown.

According to an embodiment, the video data may include color data, and the color data may include first color data C1, second color data C2, and third color data C3. The first color data C1, the second color data C2, and the third color data C3 may have the same bit data capacity. According to an embodiment, the color data may include RED data, GREEN data, and BLUE data. For example, the first color data C1 may include RED data, the second color data C2 may include GREEN data, and the third color data C3 may include BLUE data. The color data is not limited to three types, and may include more various types of color data in some cases.

According to an embodiment, the image processing device 200 may generate the first video image I1 based on any one of the first color data C1, the second color data C2, and the third color data C3 and generate the second video image I2 based on different color data from color data corresponding to the first video image I1 among the first color data C1, the second color data C2, and the third color data C3. For example, when the image processing device 200 generates the first video image I1 based on the first color data C1, the image processing device 200 may generate the second video image I2 based on the second color data C2 or the third color data C3 except for the first color data C1 corresponding to the first video image I1.

According to an embodiment, the image processing device 200 may generate a first video image and a second video image based on color data to generate images having various color combinations. For example, when the image processing device 200 generates the first video image I1 based on RED data and generates the second video image I2 based on GREEN data, the image output device may output a RED image when the first output device 310 is turned on alone, output a GREEN image when the second output device 320 is turned on alone, and output a YELLOW image when the first output device 310 and the second output device 320 both are turned on.

When using a general LED light source, it is necessary to use a YELLOW LED light source to output a YELLOW image. On the other hand, the image output device may output a YELLOW image through a combination of a RED LED light source and a GREEN LED light source. That is, the image output device may implement a corresponding color image through a combination of LED light sources that have been previously used without separately providing a corresponding color LED light source in the output device 300 to output a desired color image.

In addition, in the case of a general lamp, each of the LED light sources constituting a lamp is able to merely output monochromatic light, so that only one of RED data, GREEN data, and BLUE data may be practically used even when an RGB interface is used as an interface. Therefore, a plurality of interfaces are required to implement two or more colors. In contrast, the image output device may implement a video image having two or more colors using a plurality of pieces of data among RED data, GREEN data, and BLUE data using only one interface.

Figure 5:
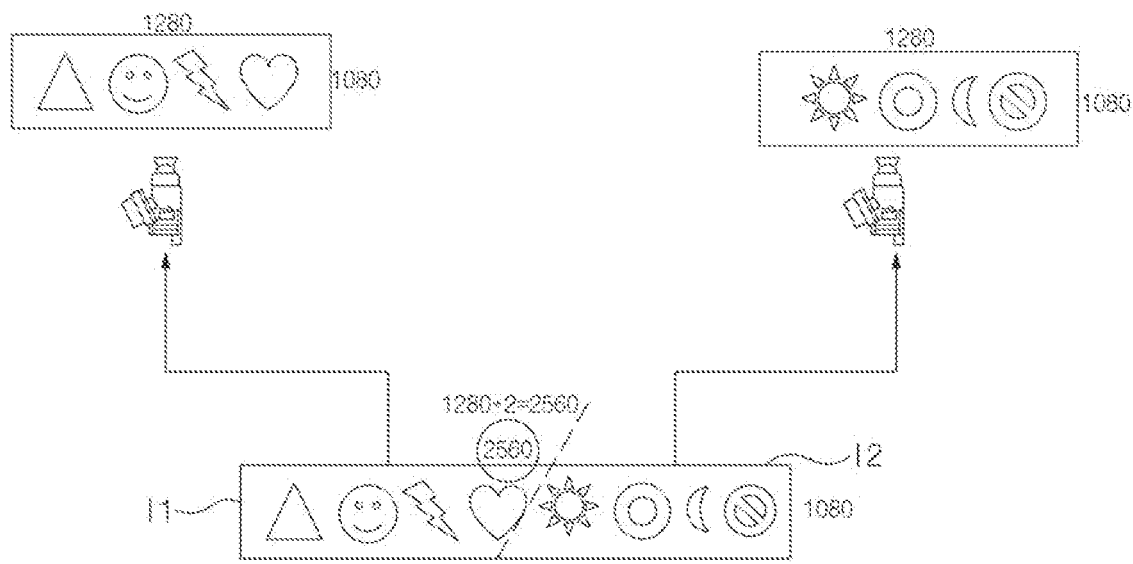
FIG. 5 is a diagram illustrating an example of generating a first video image and a second video image based on video data according to another embodiment disclosed herein.

FIG. 5 is a diagram illustrating an example of generating a first video image and a second video image based on video data according to another embodiment disclosed herein.

Referring to FIG. 5, the image processing device 200 may generate the first video image I1 and the second video image I2 having the same resolution.

According to an embodiment, the image processing device 200 may convert video data into video images and then divide the converted video images into the first video image I1 and the second video image I2. According to an embodiment, the video data may have a horizontal resolution equal to the sum of the horizontal resolutions of the first video image I1 and the second video image I2. In this case, the first video image I1 and the second video image I2 may have the same horizontal resolution. For example, when the horizontal resolution of the first video image I1 and the second video image I2 to be output by the output device 300 is 1280, the image processing device 200 may generate a video image having a horizontal resolution of 2560, which is twice the horizontal resolution of the first video image I1 and the second video image I2. The interface 100 may generate video data such that a video image has a horizontal resolution of 2560.

According to the embodiment, the video data may have a frequency ½ times the frequency of the first video image I1 and the second video image I2. The interface 100 may generate image data based on a generation period of a digital signal, whether or not a clock has occurred, and the like. In this case, to generate two video images based on the video data generated by one interface 100, a signal generation period of the interface 100 may be set to be two times. When the signal generation period set to be two times is 2T, the first video image I1 may be generated based on a signal generated during a former time T, and the second video image I2 may be generated based on a signal generated during a latter time T. That is, the signal generation period of the video data may be twice the signal generation period of the first video image I1 and the second video image I2. In this case, because a frequency is inversely proportional to a period, a frequency of video data may be ½ times the frequency of the first video image I1 and the second video image I2.

Figure 6:
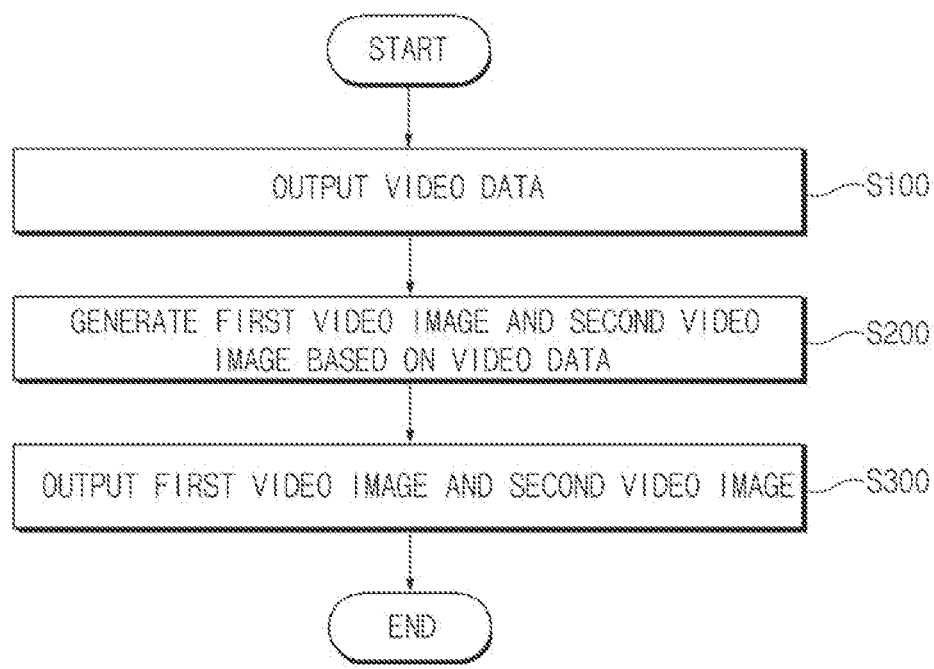
FIG. 6 is a flowchart for describing an image output method according to an embodiment disclosed herein.

FIG. 6 is a flowchart for describing an image output method according to an embodiment disclosed herein.

Referring to FIG. 6, an image output method may include outputting video data (S100), generating a first video image and a second video image based on the video data (S200), and outputting the first video image and the second video image (S300).

In S100, the interface 100 may output video data. The interface 100 may include an image processor that generates video data.

In S200, the image processing device 200 may generate the first video image I1 and the second video image I2 based on the video data.

In S300, the output device 300 may output the first video image I1 and the second video image I2. The output device 300 may include the first output device 310 and the second output device 320. The first output device 310 may output the first video image I1, and the second output device 320 may output the second video image I2.

Figure 7:
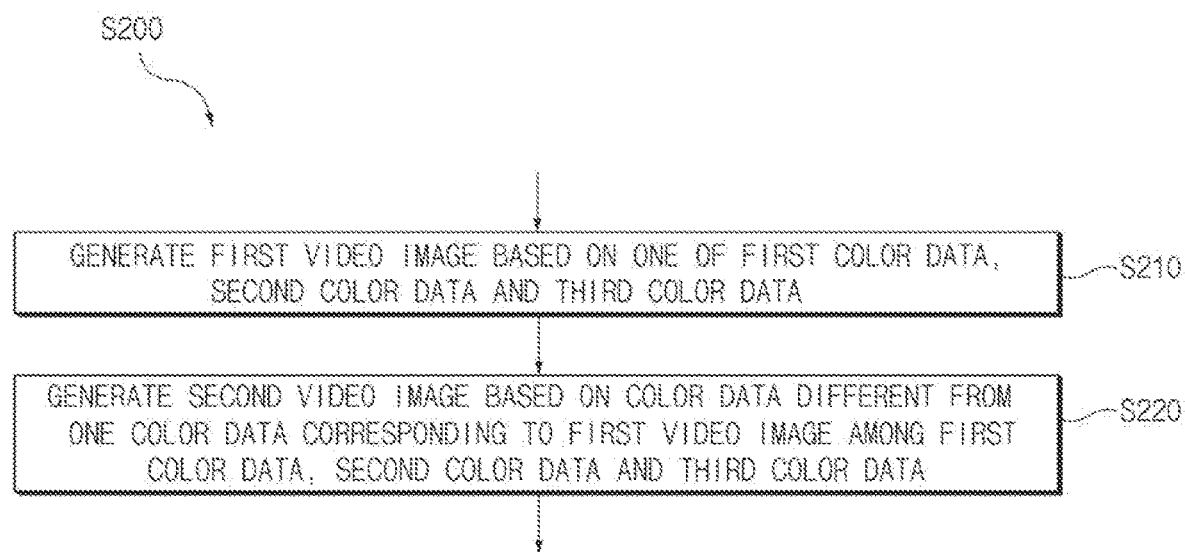
FIG. 7 is a diagram for describing a method of generating a first video image and a second video image based on video data according to an embodiment disclosed herein.

FIG. 7 is a diagram for describing a method of generating a first video image and a second video image based on video data according to an embodiment disclosed herein.

Referring to FIG. 7, S200 may include generating the first video image I1 based on any one of the first color data C1, the second color data C2, and the third color data C3 (S210) and generating the second video image based on different color data from color data corresponding to the first video image I1 among the first color data C1, the second color data C2, and the third color data C3 (S220).

In S210, the image processing device 200 may generate the first video image I1 based on any one of the first color data C1, the second color data C2, and the third color data C3.

In S220, the image processing device 200 may generate a second video image based on color data different from color data of one video data corresponding to the first video image I1 among the first color data C1, second color data C2, and third color data C3.

According to an embodiment, when the image processing device 200 generates the first video image I1 based on the first color data C1, the image processing device 200 may generate the second video image I2 based on the second color data C2 or the third color data C3, except for the first color data corresponding to the first video image I1.

According to an embodiment, in S200, the image processing device 200 may generate the first video image I1 and the second video image I2 having the same resolution.

Even though all the elements of the embodiments are coupled into one or operated in the combined state, the present disclosure is not limited to such an embodiment. That is, all the elements may be selectively combined with each other without departing the scope of the present disclosure.

In addition, terms such as "including", "comprising", or "having" described above should be interpreted in default as inclusive or open rather than exclusive or closed unless expressly defined to the contrary. All the teams that are technical, scientific or otherwise agree with the meanings as understood by a person skilled in the art unless defined otherwise. Generally-used terms as those defined in a dictionary are to be interpreted as having meanings equal to the contextual meanings in the relevant field of art, and are not to be interpreted as having ideal or excessively formal meanings unless clearly defined in the disclosure.

The above description is merely illustrative of the technical idea of the present disclosure, and various modifications and variations may be made without departing from the essential characteristics of the embodiments of the present disclosure by those skilled in the art to which the embodiments of the present disclosure pertains. Therefore, the embodiments of the present disclosure are provided to explain the technical spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

The image output device according to embodiments disclosed herein may implement outputs of two left and right lamps with only one image interface.

The image output device according to embodiments disclosed herein may reduce material costs by adjusting the specifications and number of image processors using only one image interface.

In addition, various effects may be provided that are directly or indirectly understood through the disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An image output device for first and second external lamps of a vehicle, comprising:
   an interface configured to output video data;
   an image processing device configured to generate, based on the video data output from the interface, first and second video images; and
   an output device configured to output the first and second video images from the first and second external lamps, respectively,
   wherein the video data has a horizontal resolution equal to a sum of a first horizontal resolution of the first video image and a second horizontal resolution of the second video image.

2. The image output device of claim 1, wherein:
   the video data includes color data, and
   the image processing device is configured to generate, based on the color data, the first and second video images.

3. The image output device of claim 2, wherein:
   the color data includes first color data, second color data, and third color data, and the image processing device is configured to:
   generate the first video image based on the first color data; and
   generate the second video image based on the second or third color data.

4. The image output device of claim 3, wherein:
   the output device includes first and second output devices,
   the first output device is configured to output the first video image, and
   the second output device is configured to output the second video image.

5. The image output device of claim 1, wherein the image processing device includes a serializer.

6. The image output device of claim 1, wherein the first video image and the second video image have a common resolution.

7. The image output device of claim 1, wherein a frequency of the video data is a half of a frequency of the first video image and the second video image.

8. The image output device of claim 1, wherein:
the output device includes a first output device and a second output device,
the first output device is configured to output the first video image, and
the second output device is configured to output the second video image.

9. A method for outputting an image from first and second external lamps of a vehicle, comprising:
outputting video data;
generating, based on the video data, first and second video images; and
outputting the first and second video images from the first and second external lamps, respectively,
wherein the video data has a horizontal resolution equal to a sum of a first horizontal resolution of the first video image and a second horizontal resolution of the second video image.

10. The method of claim 9, wherein:
the video data includes first color data, second color data, and third color data, and
generating the first video image and the second video image based on the video data includes:
generating the first video image based on the first color data; and
generating the second video image based on the second or third color data.

11. The method of claim 9, wherein generating the first and second video images includes generating the first and second video images having a common resolution.

* * * * *